United States Patent [19]

Stayner et al.

[11] 4,140,554
[45] Feb. 20, 1979

[54] WATER-RINSABLE SOLDERING FLUID CONTAINING A POLYAMIDE DISPERSANT

[75] Inventors: Robert A. Stayner, Lafayette; Warren Lowe, El Cerrito, both of Calif.

[73] Assignee: Chevron Research Company, San Francisco, Calif.

[21] Appl. No.: 838,198

[22] Filed: Sep. 30, 1977

[51] Int. Cl.$^2$ .............................................. B23K 35/34
[52] U.S. Cl. ........................................................ 148/23
[58] Field of Search ...................................... 148/23–25

[56] References Cited

U.S. PATENT DOCUMENTS

| | | | |
|---|---|---|---|
| 3,527,625 | 9/1970 | Mollring | 148/24 |
| 3,589,952 | 6/1971 | Burne | 148/24 |
| 3,655,461 | 4/1972 | Miwa | 148/23 |
| 3,814,638 | 6/1974 | Jordan | 148/23 |
| 3,832,242 | 8/1974 | Cuthbert | 148/23 |
| 3,837,932 | 9/1974 | Aronberg | 148/23 |
| 3,985,587 | 10/1976 | Choby | 148/23 |
| 4,060,191 | 11/1977 | Choby | 148/23 |

*Primary Examiner*—P. D. Rosenberg
*Attorney, Agent, or Firm*—D. A. Newell; J. J. DeYoung

[57] ABSTRACT

Disclosed is a water-rinsable soldering fluid comprising a mixture of a polyalkylene ether and a polyamide. The polyamide is formed from the reaction of a carboxylic acid and a polyalkylene polyamine.

9 Claims, No Drawings

WATER-RINSABLE SOLDERING FLUID CONTAINING A POLYAMIDE DISPERSANT

BACKGROUND OF THE INVENTION

The invention relates to soldering fluids used in soldering processes. More particularly, this invention relates to the use of a water-rinsable soldering fluid used in a wave-type soldering process. Wave-type soldering processes are commonly used for soldering or tinning electrical circuits, particularly printed circuits. Wave-type soldering processes are described in the book, "Solders and Soldering", by Howard H. Manko, published by McGraw-Hill (1974), the entire disclosure of which is incorporated herein by reference.

The advent of the printed circuit has greatly facilitated the rapid production of accurately connected sophisticated miniature electrical circuits. However, the demands on the soldering device to enhance their efficient use are continuously increasing. In many such devices, oil is used with the solder to provide a better distribution of the solder on the areas to be coated, to aid in removal of the excess solder, to protect the solder from oxidation or discoloration while being cooled, and to keep the hot solder clean by providing a protective coating. In one particular device, solder and soldering oil are pumped together continuously to form a wave through which the bottom of the printed circuit board is passed.

It is well understood that an oil blanket on the solder pot will inhibit dross formation. Dross is an expensive consumer of solder and its abrasive action can also wear out the solder pump. Since dross (the oxides of tin and lead) is formed when molten solder comes in contact with air, there is an advantage in establishing a barrier between the air and the molten solder. Although soldering oils have worked well for this purpose, the oil tends to leave a film on the piece being soldered. The residual oil and other residual components, such as flux, must be removed from the soldered piece. This has typically been done by vapor degreasing or by employing some other oil solvent cleaning process. These have not been wholly satisfactory due to the high cost associated with air pollution control problems. In addition, water-detergent cleaners have been used, but only with moderate success due to incomplete removal of the oily residues from the soldered surfaces and due to problems related to the disposal of the oily wash water. Thus, the industry has long desired a water-rinsable soldering fluid to take the place of soldering oils.

Water-rinsable soldering fluids are available commercially and generally comprise a polyglycol (a polyether) and an antioxidant to help prevent degradation of the polyglycol. A dross scavenger comprising an acidic additive is also frequently added to the soldering fluid. The acidic component, generally a fatty acid, functions to scavenge the dross through chemical reaction. As the solder wave becomes exposed to air during pumping, dross may form on the wave to some degree. When it does, the fatty acid reacts with the lead and tin oxides to form oil dispersible soaps. These soaps remain in suspension for many hours and are removed when the spent oil is removed from the reservoir at set intervals. The water-rinsable soldering fluids provide for easy cleaning of the soldered pieces but suffer the deficiency of not providing good soldering definition by permitting bridging, icicling and excessive solder deposits on the pieces being soldered. Modern-day electrical circuit boards require extremely close tolerances between lines and pieces being soldered and essentially require bridge-free, icicle-free soldering of circuits of narrow line widths frequently as small as 1/2000-inch part. Furthermore, the presence of effective concentrations of organic acids lowers the flash points of the composition to less than 500° F., which is too low for currently desirable high-flash-point soldering fluids.

SUMMARY OF THE INVENTION

A water-rinsable soldering fluid is disclosed comprising a mixture of a polyalkylene ether having a flash point greater than 400° F. and a polyamide formed from the reaction of a fatty acid and a polyalkylene polyamine.

DETAILED DESCRIPTION OF THE INVENTION

Surprisingly superior water-rinsable soldering fluids have been found comprising high-boiling polyalkylene ethers and a polyamide formed from the reaction of a fatty acid and a polyalkylene polyamine.

The water-rinsable soldering composition of the present invention has been found to be surprisingly superior in providing excellent solder definition and essentially bridge-free, icicle-free soldering of electrical circuit boards, and is capable of being used in high-temperature applications without danger of flashing. The soldering fluid composition of the present invention has been found to be superior to other water-rinsable soldering fluids containing fatty acid dross scavengers. Also, the soldering fluids of the present invention are superior to other soldering fluids containing other well-known dispersants, such as sulfonates and succinimides.

The polyalkylene ethers of the present invention are high-boiling, high-molecular-weight polyalkylene ethers. The ethers must be liquid at the temperature of the solder bath and must have high flash points in order to prevent excessive vaporization at the high soldering bath temperatures. Solder bath temperatures range from 400° to 500° F. or higher, and more commonly 470° to 490° F. The ethers may be characterized as having a flash point greater than the soldering bath temperature, i.e., greater than 400° F., and generally greater than 500° F. The soldering fluid, and particularly the polyakylene ether, must be water-rinsable. By "water-rinsable" it is meant that the fluid is at least 1 weight percent soluble in water.

Suitable polyethers include polyethylene glycol, polybutylene glycol, and the like. Furthermore, one or both of the terminal hydroxy groups may be replaced by an alkoxy group, such as methoxy, ethoxy, and the like. These terminating groups may be added to a preformed polymer; more typically one terminating group results from the use of a hydroxyl initiator for polymerizing an epoxide. Preferred initiators are the alkyl phenols. Polyether copolymers are also contemplated, for example, a copolymer of ethylene glycol and propylene glycol. These copolymers may have a random or block structure, or mixtures thereof. Suitable polyalkylene ethers are available from many commercial sources. For example, the polyalkylene ethers manufactured by General Aniline and Film Corporation, and commonly known as IGEPAL, are particularly preferred. These polyethers are made from the reaction of nonyl phenol and ethylene oxide. Especially preferred are the single alkylphenol-capped polyglycols, particularly the aforementioned GAF IGEPAL compositions.

The polyamide dispersants of the present invention are well known in the art, see for example, U.S. Pat. No. 3,169,980 the entire disclosure of which is incorporated herein by reference.

The polyamides of the present invention are formed by reacting a carboxylic acid with a polyalkylene polyamine. The reaction product will comprise a complex mixture consisting essentially of amide. The major amount of the polyamides may be conveniently illustrated by the following structural formula:

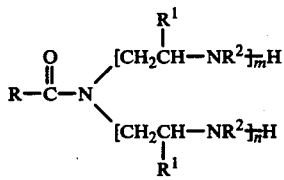

where
R is a hydrocarbyl group of 12 to 30 carbon atoms;
$R^1$ is H, $CH_3$—
m, n are independently 0 to 6,
m + n is 1 to 12
$R^2$ is

or H where at least one $R^2$ is

The polyamide is conveniently prepared according to known methods by reacting the polyamine and the carboxylic acid, preferably a fatty acid, at conventional temperatures for the usual period of time required to amidify the amino groups of the polyalkylene polyamine. Typical reaction temperatures range from about 250° F. to about 500° F. Usually the amidification reaction requires about 2 to 10 hours. Means for removing water of condensation is employed and reduced pressures are desirable to effect amidification at the lower reaction temperatures.

The proportion of fatty acids and polyakylene polyamine may be such that the mols of fatty acids are equal to the molar equivalence of amine groups in the polyalkylene polyamine. It is preferred that the mols of fatty acid be in the range from about 1 to about 3 mols less than the number of available amino groups in the polyamine. Suitable fatty acids for preparation of the polyamides of the present invention contain from 12 to 30 carbon atoms, and preferably from 16 to 20 carbon atoms. Illustrative straight-chain acids include behenic acid, tridecanoic acid, oleic acid, lauric acid, myristic acid, palmitic acid, isostearic acid, stearic acid, eicosanoic acid, triacontanoic acid, etc. Suitable branched-chain fatty acids are those derived by synthesis, such as oxidation of olefins and polyolefins. Acids derived from the Oxo process are also suitable. Another source is the copolymerization of an unsaturated acid and an olefin followed by hydrogenation. Other acids suitable for use in making the amides of this invention are the naphthenic acids, usually isolated from crude oil, and having the structure of alkyl cyclohexane and alkyl cyclopentane-carboxylic acids.

The polyalkylene polyamines contain from 2 to 6 alkaline amine units with from 2 to 4 carbon atoms in each alkylene group. Illustrative amines include diethylene triamine, triethylene tetraamine, tetraethylene pentaamine, hexaethylene heptaamine, heptaethylene octaamine, tetrapropylene pentaamine, hexabutylene heptaamine, and the like. For present purposes, triethylene tetraamine and tetraethylene pentaamine are preferred for availability and effectiveness of the polyamides prepared therefrom.

A particularly preferred polyamide is the one formed from the reaction of tetraethylene pentaamine and isostearic acid at a 1 to 3 mol ratio.

The amount of the polyamide in the soldering fluid can vary widely, but generally it will be in the range of 1 to 20 weight percent, and preferably in the range of 2 to 6 weight percent.

The soldering fluid can also contain numerous other additives which are conventional and well known in the soldering fluid art. It is preferred, but not required, that the soldering fluid contain an antioxidant to help prevent degradation of the soldering fluid from contact with air, particularly degradation of the polyalkylene ether at the high temperatures utilized in the soldering bath. The class of antioxidants which may be employed are conventional ones commonly used in petroleum oils and polymers. Many exemplary antioxidants are disclosed in the book, "Antioxidants Synthesis and Application", by J.C. Johnson, Chemical Technology Review No. 44, Noyes Data Corporation (1975), the entire disclosure of which J.A.C. incorporated herein by reference. Representative antioxidants include the phenolics, particularly the hindered bis-phenolics and esters of phenolic substituted acids, sulfur-containing phenolic antioxidants, nitrogen-containing phenolic derivatives, amine and imine antioxidants, triazine and cyanurate antioxidants, and the like.

Particularly preferred antioxidants are the hindered bis-phenols, Ethyl 702, which is 4,4'-methylene bis(2,6-di-t-butyl phenol), and phenyl alpha-naphthyl amine.

The quantity of antioxidant in the soldering fluid can vary greatly but generally will be in the range of 0.1 to 3 weight percent of the soldering fluid.

What is claimed is:

1. A water-rinsable soldering fluid useful in forming a barrier between molten solder and air which comprises a mixture of a polyalkylene ether having a flash point greater than 400° F. and a polyamide formed from the reaction of a carboxylic acid and a polyalkylene polyamine.

2. The composition of claim 1 wherein said acid is a fatty acid which contains 12 to 30 carbon atoms and said polyalkylene polyamine contains 2 to 6 alkylene units with from 2 to 4 carbon atoms in each alkylene group.

3. The composition of claim 2 wherein said fatty acid contains 16 to 20 carbon atoms.

4. The composition of claim 1 wherein said polyalkylene ether has a flash point greater than 500° F.

5. The composition of claim 1 wherein said polyakylene ether comprises the reaction product of nonyl phenol and ethylene oxide.

6. The composition of claim 1 wherein said polyamide dispersant comprises the reaction product of tetraethylene pentaamine and isostearic acid.

7. The soldering fluid of claim 1 wherein said soldering fluid also contains an antioxidant.

8. The soldering fluid of claim 7 wherein said antioxidant is a hindered bis-phenol.

9. The soldering fluid of claim 7 wherein said antioxidant is phenyl alpha-naphthyl amine.

* * * * *